(12) United States Patent
Smith et al.

(10) Patent No.: US 8,919,085 B2
(45) Date of Patent: Dec. 30, 2014

(54) NET ROLL SUPPORT FOR STORAGE AND INSTALLATION IN BALER

(75) Inventors: Kevin M. Smith, Narvon, PA (US); Roger D. Mast, Jr., Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 675 days.

(21) Appl. No.: 13/096,552

(22) Filed: Apr. 28, 2011

(65) Prior Publication Data

US 2012/0272837 A1    Nov. 1, 2012

(51) Int. Cl.
*A01F 15/07* (2006.01)

(52) U.S. Cl.
CPC .................................. *A01F 15/0715* (2013.01)
USPC ........................................... 53/587; 53/389.4

(58) Field of Classification Search
CPC .............. A01F 15/071; A01F 15/0715; A01F 2015/071; A01F 2015/0715
USPC ....................... 53/399, 389.1, 587, 588, 389.4
See application file for complete search history.

(56) References Cited

U.S. PATENT DOCUMENTS

| | | | |
|---|---|---|---|
| 3,214,113 A | 10/1965 | Murray et al. | |
| 4,174,661 A * | 11/1979 | Mathes et al. | 100/5 |
| 4,580,398 A | 4/1986 | Bruer et al. | |
| 4,729,213 A | 3/1988 | Raes | |
| 5,079,898 A | 1/1992 | Springs et al. | |
| 5,231,828 A * | 8/1993 | Swearingen et al. | 56/341 |
| 5,996,307 A | 12/1999 | Niemerg et al. | |
| 6,247,291 B1 | 6/2001 | Underhill | |
| 7,430,959 B2 | 10/2008 | Routledge | |
| 7,478,517 B2 * | 1/2009 | Paillet et al. | 53/587 |
| 7,500,571 B2 * | 3/2009 | Hawkinson | 211/59.3 |
| 7,617,653 B2 | 11/2009 | Viaud et al. | |
| 7,908,822 B2 | 3/2011 | McClure | |
| 2005/0241278 A1 * | 11/2005 | Hulshof | 53/576 |
| 2007/0184729 A1 * | 8/2007 | Kicker | 440/102 |
| 2007/0246270 A1 * | 10/2007 | Priepke et al. | 180/53.1 |

FOREIGN PATENT DOCUMENTS

| | | |
|---|---|---|
| DE | 10004564 A1 | 8/2001 |
| DE | 102006049139 A1 | 4/2008 |
| EP | 0289091 A1 | 11/1988 |
| EP | 1080628 A1 | 3/2001 |
| EP | 1602269 A1 | 12/2005 |
| EP | 1602270 A1 | 12/2005 |
| FR | 2845562 A1 | 4/2004 |
| GB | 2304321 A | 3/1997 |

* cited by examiner

*Primary Examiner* — Stephen F Gerrity
(74) *Attorney, Agent, or Firm* — Patrick M. Sheldrake; Seyed V. Sharifi T.

(57) ABSTRACT

A baler and method of using the improved baler to install net rolls into a net wrapping assembly in the baler. The baler includes a separable support tube configured to separate and reattach within the net roll during installation. The baler also includes a platform to support the net roll during installation. The platform also stores net rolls prior to installation.

14 Claims, 12 Drawing Sheets

NET ROLL SUPPORT FOR STORAGE AND INSTALLATION IN BALER

TECHNOLOGY FIELD

The present disclosure relates generally to a net roll support for installation and storage of a net roll in a baler.

BACKGROUND

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler, for example a round baler, the most frequently used in industry, travels along the windrows to pick up the crop material and form it into cylindrically-shaped round bales.

More specifically, the cut crop material is gathered at the front of the baler from along the ground, onto a pickup assembly, and introduced into a bale-forming chamber within the baler. Inside the cut crop is rolled up into a predetermined size. A conventional bale chamber may include a pair of opposing sidewalls with a series of belts, chains, and/or rolls that rotate and compress the crop material into the cylindrically-shaped round bale. When the predetermined size is achieved, the cylindrically-shaped round bale is wrapped and bound by either net wrapping, plastic wrapping, and/or wire. After the round bale is wrapped, the back of the baler, or tailgate, opens and the wrapped bale is discharged.

Net wrapping, here after referring to net and plastic wrapping, is fed into the baler off a net roll and into a net wrapper assembly, conventionally located in the front of the baler. As the baler forms, bounds, and distributes the bale, netting is depleted until the net roll needs to be replaced by a spare net roll. Typically, one or two spare net rolls are stored on the baler, usually housed at the rear of the baler at the tailgate. When a net roll needs to be replaced, the operator discards the depleted net roll, walks to the back of the baler to acquire a stored net roll, then walks the stored net roll to the front of the baler, and then installs the new net roll. Net roll length typically measures 122 to 130 centimeters (48 to 51 inches) in length and between 30 and 45 kilograms (70 and 100 pounds) in weight. The size and weight of the net rolls impose for awkward transport from the rear and awkward installation at the front of the baler. The operator is tasked to lift the net roll to a net supporting tube and slide the net roll onto the tube. The supporting tube can be 4 to 5 feet off the ground. Additionally, once on the tube, the net roll needs to be threaded into the net wrapper assembly and the net roll is then pushed into the operating position. Thus, it is desirable to minimize operator effort to replace a net roll in a baler. Relatedly, it is also desirable to improve storage capability of net rolls on round balers.

What is needed is a process for net roll installation into the net wrapper assembly that minimizes manual operator effort to install spare net rolls into an active net roll position in the assembly, minimizes time of total manual operator involvement when replacing and installing a net roll, and thus effectively improves the capability of the baler.

SUMMARY

Embodiments of the present invention provide a process to improve installation of a net roll into the net wrapper assembly. The invention provides a net roll support for installation and storage for spare net rolls.

Embodiments of the present invention are directed to a baler comprising a net wrapper assembly. The baler further includes a separable net support tube comprising a first support tube, a second support tube, and a mating connection. The first end of the first support tube is connected to the net wrapper assembly at a pivoting element on the net wrapper assembly. The second end of the first support tube and a first end of the second support tube are connected at the mating connection within a net roll forming the separable net support tube during installation of the net roll into the net wrapper assembly. The formed separable net support tube is attached to the net wrapper assembly at a second end of the second support tube when the net roll is in a wrapping active position within the net wrapper assembly.

According to one embodiment of the invention, the baler further includes a platform that supports the weight of the net roll during installation. The platform includes a top surface where the net roll lies and one or more top surface support pieces connected to the top surface and extending below the top surface and are mounted to the baler in proximity to the front of the baler. According to another aspect of one embodiment of the invention, the platform stores the net roll on the top surface prior to installation.

According to another aspect of one embodiment of the invention, the platform further includes an adjustable extension support to support net rolls of various lengths. The adjustable extension support lies in a support channel on the top surface of the platform located centrally in the top surface and extending to an edge of the top surface so that the adjustable extension support may be extended outside of the edge to increase support of the net roll stored on the top surface of the platform. According to another aspect of one embodiment of the invention, the adjustable extension support is extended beyond the edge of the platform by sliding the adjustable extension support out of the support channel to increase for longer length net rolls or retracted by sliding the adjustable extension support into the edge to support shorter length net rolls. According to another aspect of one embodiment of the invention, a top side surface of the support channel is below the top surface of the platform to support a portion of the net roll partially lying on the topside surface to prevent the net roll from rolling laterally off the top surface of the platform. According to another aspect of one embodiment of the invention, the adjustable extension support comprises an end support mounted to one end of the adjustable extension support to prevent the net roll from sliding forward or backward off the edge of the top surface of the platform.

According to another aspect of one embodiment of the invention, the platform includes one or more legs mounted to one or more of the top surface support pieces of the platform and extending above the top surface of the platform to prevent a stored net roll from rolling laterally off the top surface of the platform. According to another aspect of one embodiment of the invention, the one or more legs rotate about a pivot connection on one of the top surface support pieces wherein the one or more legs rotate vertically up to contain the stored net roll on the top surface of the platform.

According to another aspect of one embodiment of the invention, the platform stores the net roll in a perpendicular position relevant to a net roll support bar holding a net roll in the active position in the net wrapper assembly. According to another aspect of one embodiment of the invention, the net roll stored on the platform is located at approximately the same height from the ground as a net roll held by a net roll support bar in the active position in the net wrapper assembly.

According to another aspect of one embodiment of the invention, the one or more top surface support pieces of the platform are bolted a hitch linking the baler with a tractor.

According to another embodiment of the invention, the mating connection is secured by a lock. The lock is formed when the second end of the first support tube including a lock pin enters a sleeve on the first end of the second support tube including a pin guide and the second support tube is turned such that the lock pin slides into the pin guide.

According to another embodiment of the invention, the second support tube is telescopic extending to connect to the first support tube at the mating connection.

Embodiments of the present invention are directed to a method for installing a net roll into a net wrapper assembly for activation. The method includes pivoting a first support tube away from the net wrapper assembly. A first end of the first support tube is connected to a pivoting element on the net wrapper assembly. The method further includes inserting a second end of the first support tube in a first opening of a shaft passageway extending from the first opening through a net roll to a second opening in the net roll. The second end of the first support tube is opposite the first end. The method further includes pushing the net roll onto the first support tube. The method further includes inserting a first end of a second support tube into the second opening of the shaft passageway in the net roll. The method further includes connecting the second end of the first support tube and the first end of the second support tube inside the shaft passageway in the net roll. The method further includes pivoting the net roll supported by the connected first and second support tubes toward the net wrapper assembly at the first end of the first support tube connection with the pivoting element. The method further includes fastening a second end of the second support tube into the net wrapper assembly such that the net roll is in a wrapping activation position in the net wrapper assembly.

According to another embodiment of the invention, the method further includes supporting the net roll on a top surface of a support platform during installation. One or more top surface support pieces are connected to the top surface of the support platform and extend below the support platform and bolt to a hitch linking the baler with a tractor.

According to another embodiment of the invention, the method further includes storing the net roll on a top surface of a support platform before installation. One or more top surface support pieces are connected to the top surface of the support platform and extend below the support platform and bolt to a hitch linking the baler with a tractor.

According to another aspect of one embodiment of the invention, storing the net roll further includes preventing the net roll from sliding forward off a front end or backward off a back end of the top surface of the platform with one or more end supports connected to the front end and one or more end supports connected to the back end opposite the front end of the support platform.

According to another aspect of one embodiment of the invention, storing the net roll further includes preventing the net roll from rolling off sides of the top surface of the platform with one or more vertical legs mounted to the side skirts of the platform and extending above the sides of the top surface of the platform. According to another aspect of one embodiment of the invention, preventing the net roll from rolling off sides of the top surface further includes supporting the net roll with a backstop mounted horizontally across the one or more vertical legs. The backstop is approximate in length to the length of the net roll.

According to another embodiment of the invention, the inserting a second end of the first support tube step includes extending the first support tube telescopically from the pivot connection through the first opening and through the shaft passageway and out the second opening for connecting the first support tube with the second support tube outside the net roll and without inserting the first end of the second support tube into the second opening of the net roll.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

The problems in the prior art have motivated the creation of a net roll support for improved net wrapper installation in a baler and processes to minimize manual operator effort when installing a spare net roll into the baler for activation. In some embodiments, the present invention also provides improved net roll storage on the baler.

Figure 1:
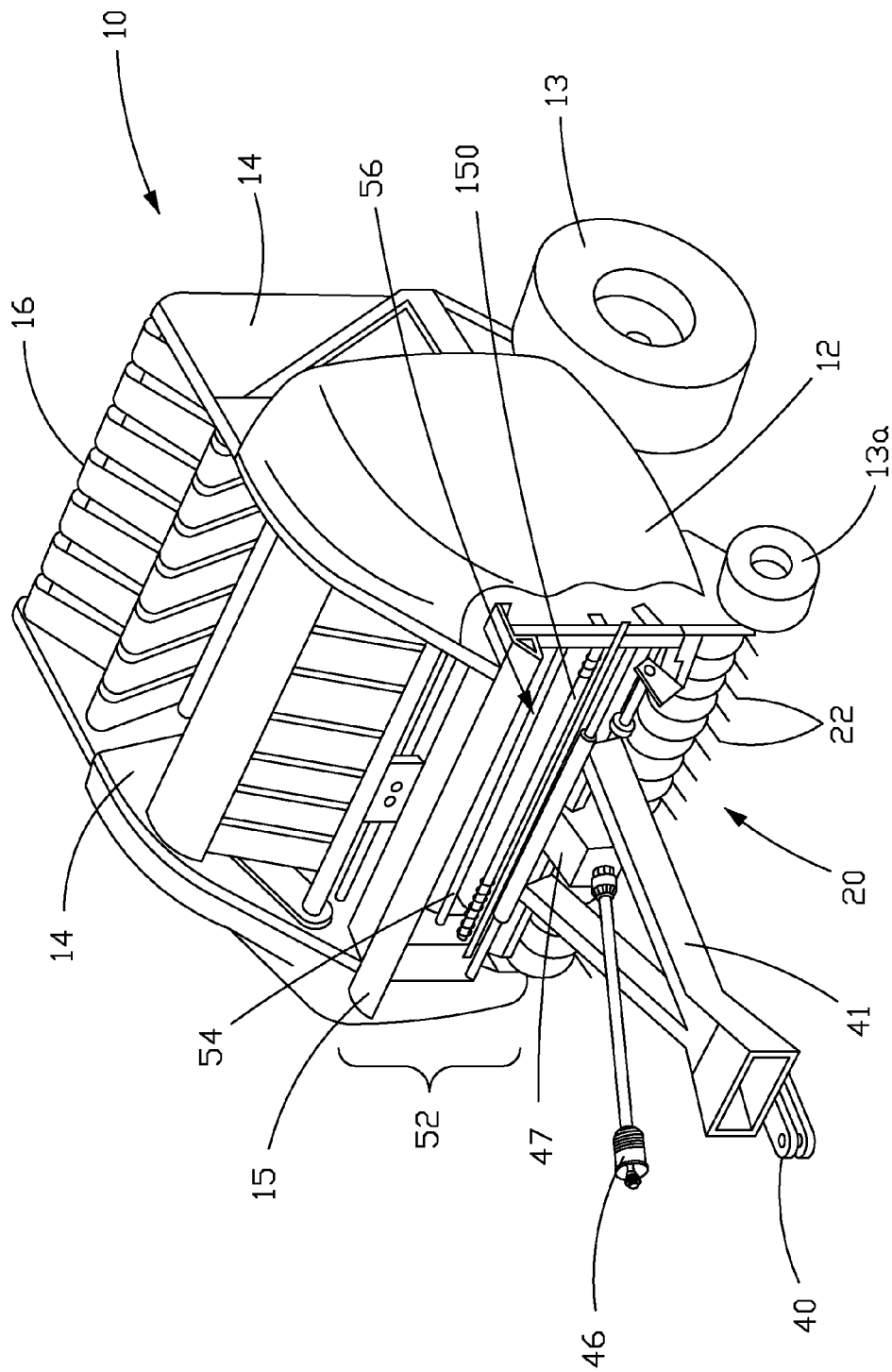
FIG. 1 illustrates an exemplary round baler.

FIG. 1 illustrates an exemplary conventional round baler. As shown in FIG. 1, round baler 10 is enclosed by a main frame 12, comprising a plurality of rigid structural elements including a pair of side walls 14. Main frame 12 is supported by a pair of rear wheels 13. A forwardly mounted hitch 40, integrated with the main frame 12, provides for connection to a tractor. A PTO shaft 46, or power take off shaft, is located herein above the hitch 40. In other balers, the PTO shaft may be located and connected to the tractor below the hitch. The PTO shaft draws energy from a tractor driving the hitch and transfers that energy to drive mechanisms in the baler 10. Rear side 16, typically comprises a tailgate which is closed during baling and opened to eject finished bales. In conventional balers, storage to house spare net rolls is typically located about the tailgate.

Also shown in FIG. 1 is the front side 15 of the baler. This side faces the rear of a tractor as connected to by the hitch 40 and PTO shaft 46. At the bottom of the front side, between a front pair of wheels 13a, and mounted to the mainframe 12, is the pickup 20. The pickup 20 is supported by the pair of front wheels 13a. Pickup tines 22 wrap around and connect within the pickup 20. The tips of the tines 22 are movable along a predetermined path along the ground to lift crop material from the ground and deliver it rearward along a generally horizontal path toward a floor roll (not shown) at the bottom of the baler, which is rotatably mounted on main frame 12. During baling, the floor roll conveys crop material further rear into a bale chamber where belts then urge the material upwardly and forwardly into engagement with sledge rolls. The sledge rolls coil crop material in a round direction to form and add to a bale core. Continued feeding by pickup tines 22 urge additional crop material into the forming bale in a generally spiral fashion growing the bale core.

FIG. 1 shows a net wrapper assembly 52 above the pickup 20, hitch mount 41, and PTO shaft mount 47. In this exemplary baler, the net wrapper assembly 52 comprises an active roll cavity 54. When the baler is in use, the active roll cavity 54 would house a net roll which would spin around a net support tube 150 as netting is fed into a net feeding entry 56.

Figure 2:
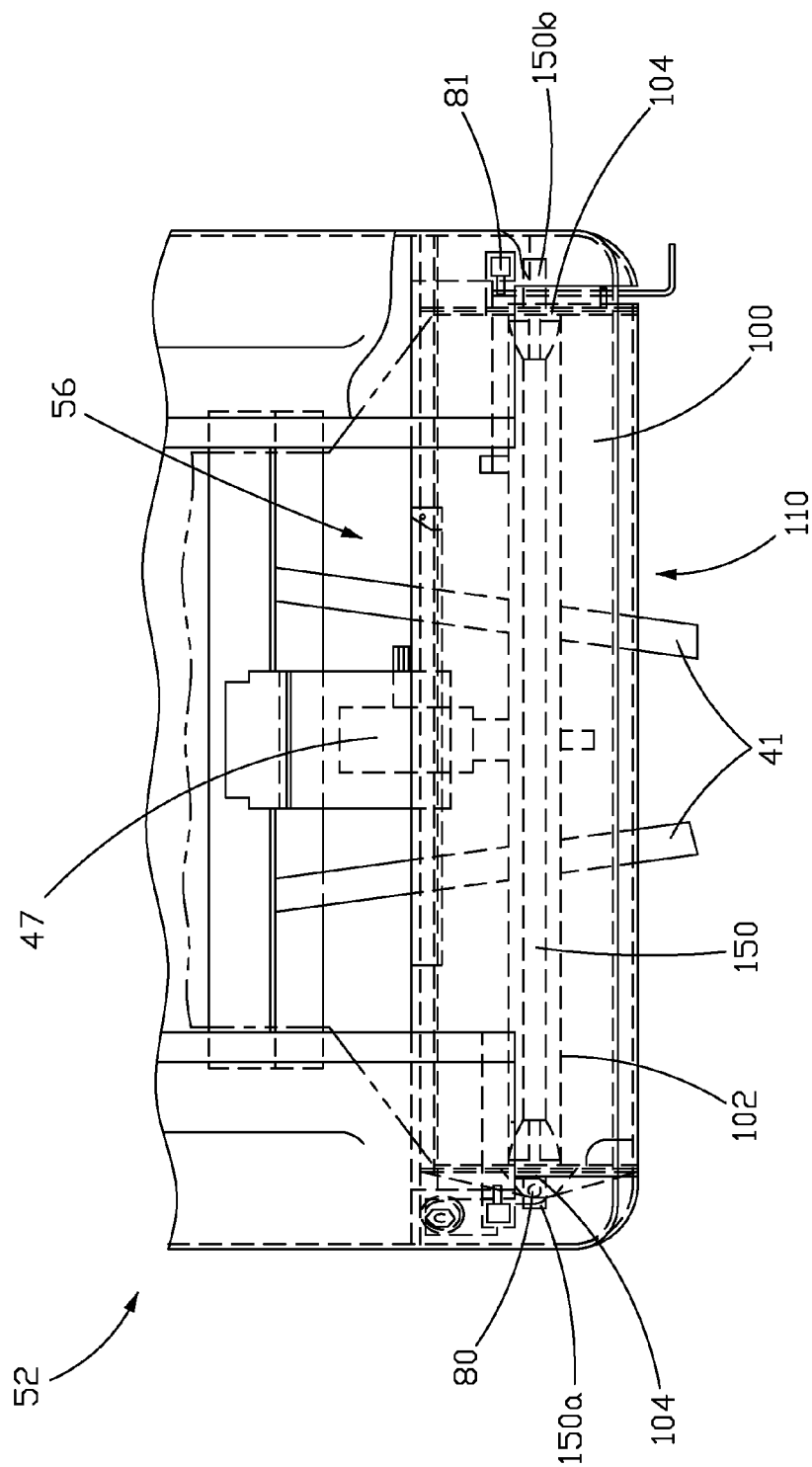
FIG. 2 illustrates a top view of an exemplary net wrapper assembly with a net roll in active position.

FIG. 2 shows a top view of the net wrapper assembly 52 from FIG. 1. This particular net wrapper assembly 52 comprises a net roll 100 for netting a bale of crop material in the baler 10 when in an active net roll position 110. After a cylindrical package of crop material has been formed in the baler, it is wrapped with wrapping from the net wrapper assembly 52 utilizing either plastic or netting to encompass the package and form the round bale.

A net roll, as shown in FIG. 2, is cylindrical comprising two net roll openings 104 on each of the flat ends of the cylinder. The roll is typically either approximately 122 cm (48 inches) or 130 cm (51 inches) in length. The diameter of a net roll, prior to any netting being extracted from the net roll and then administered through the net wrapper assembly 52 is approximately 31 centimeters (12 inches) in diameter. The roll comprises a net roll shaft passageway 102, extending from between each opening 104 in the net roll. The diameter of the net roll shaft passageway 102, is typically 9 centimeters (3.5 inches), and the passageway 102 is typically centered radially from the outer circumference of the net roll 100. In the active net roll position 110, a single, or one-piece, or continuous net support tube 150 extends through the net roll shaft passageway 102 connected within the net wrapper assembly 52. A first end 150a of the net support tube 150 connects in the net wrapper assembly 52 at a pivot connection 80 and a second end 150b of the net support tube 150 connects in the net wrapper assembly 52 at an arm lock connection 81.

Figure 3:
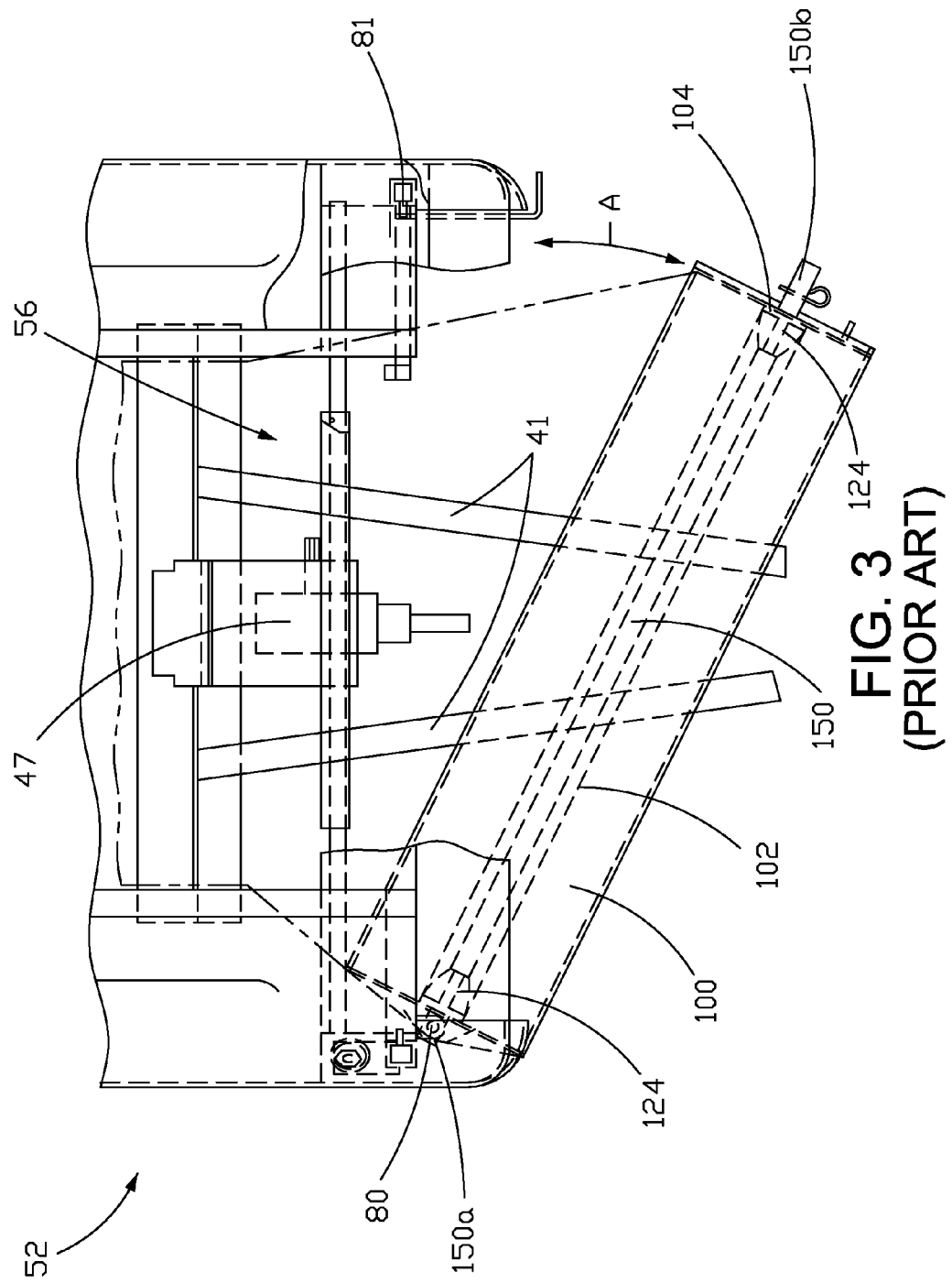
FIG. 3 illustrates a top view of an exemplary net wrapper assembly with net roll in a non-active position.

FIG. 3 shows the net wrapper assembly 52 in FIG. 2 with the net roll 100 swung along path A out from the active net roll position 110. From this position, FIG. 3 shows the second end 150b of the net support tube 150 exposed as extending outside of the net roll opening 104. Bearings 124, connected to the support tube, are located near both ends of the net support tube 150. The bearings are typically conical in structure and fitted into the net roll opening such that the base of the cone faces connection with the net wrapper assembly. The bearings are capable of sliding along the length of the support tube to support various cylinder length net rolls. With the net roll installed on the net support tube, as seen in FIG. 3, the bearing 124 is enclosed on the net roll opening 104 such that the cone fills volume between the net roll shaft passageway 102 and net support tube 150. The base of the cone is nearly flush with ends of the net roll 100.

When the net roll is in the active net roll position, as shown in FIG. 2, the process of wrapping the bale may begin. In active position, netting is extended continuously from the net roll into the net feeding entry 56 and introduced onto the surface of the bale. As the wrapping enters the feeding entry, it is spun from the surface of a spinning net roll. The net roll 100 is spun in conjunction with the spinning of the bearings 124 installed through the net roll openings 104 on each end of the net roll 100. The single net support tube 150, located within the net roll shaft passageway 102, does not spin during the wrapping process.

Figure 4:
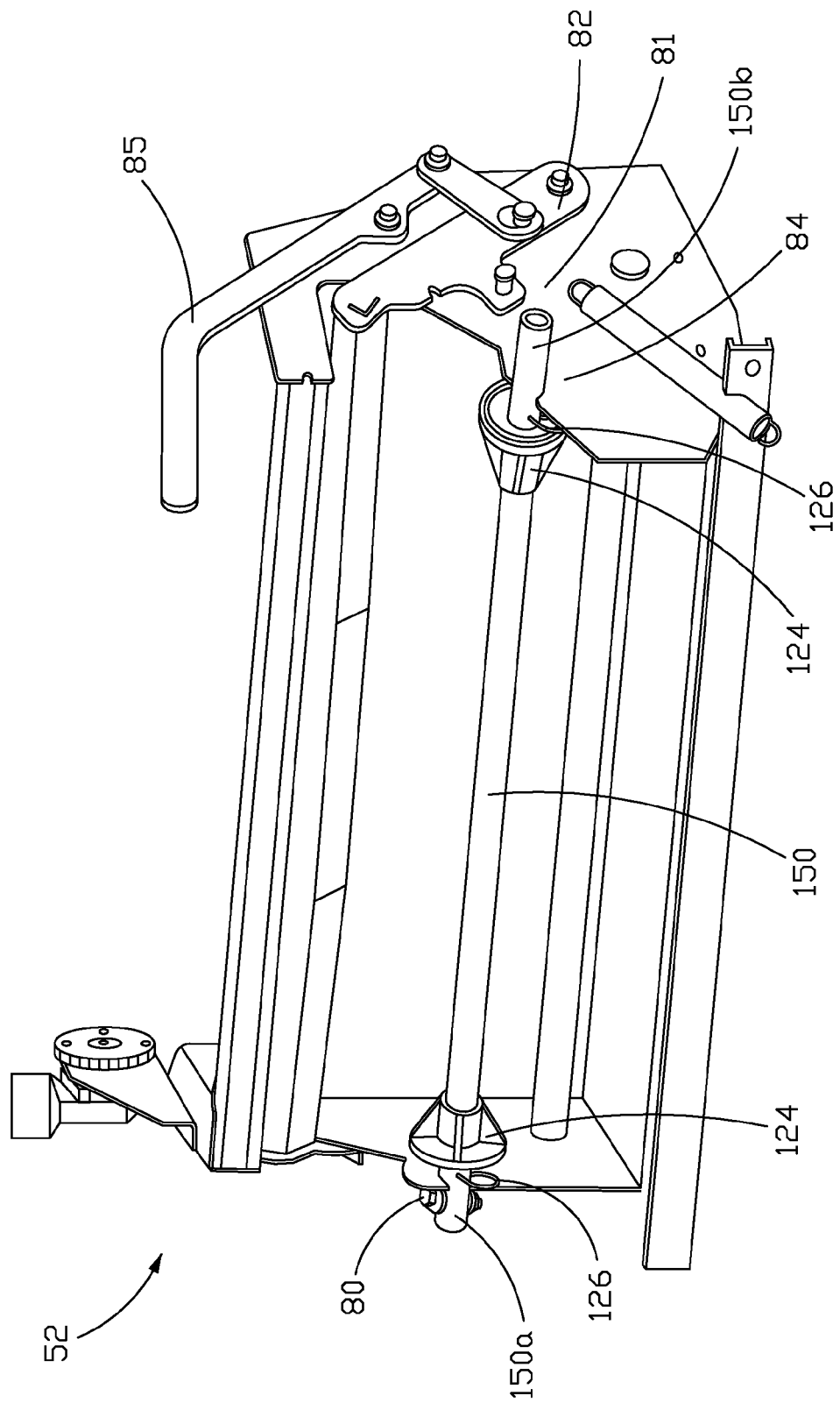
FIG. 4 illustrates a front facing view of an exemplary net wrapper assembly without a net roll.

FIG. 4 shows an exemplary front facing view of the net support tube 150 in the net wrapper assembly 52, without an installed net roll. The single net support tube 150 is capable of rotation towards and away from the net wrapper assembly 52 by pivot connection 80 for the conventional installation of a net roll 100 not shown in FIG. 4. The first end 150a of the net support tube 150 is connected to the pivot connection 80 which typically includes a pivot bolt. Bearings 124 are shown with one conical shape base facing the pivot connection 80 and the other facing the arm lock connection 81. On some support tubes, guides 126 are placed along the cone base of the bearing, so that the bearing is forced flush against the guide when the bearing is installed into the opening of a net roll. Some support tubes contain holes running linearly from the end of the support tube to the center. These often serve as connections points to place the guide 126 either closer or further from support tube 150 center to enclose various sized (e.g. length) net rolls.

In many net wrapper assemblies, and as discussed with respect to FIG. 3, the net support tube 150 can be rotated from the pivot connection 80 and back. To rotate the net support tube 150 out and away from the assembly, an operator pulls down on handle 85 to lift arm 82 off of the net roll at arm lock connection 81, as shown in FIG. 4. Arm 82 in the down position provides down force on the second end 150b of the single net support tube 150 to contain the support tube in u-shaped groove 84. When the net roll is in the active position, the net support tube is locked and limited from movement with arm 82 on top the net roll.

Removal of a depleted net roll from the active position in the assembly 52, requires an operator to pull down on handle 85 to lift arm 82 off of the net roll, then lift the net support tube 150 up and out from u-shape groove 84. The operator swings the net support tube and empty net roll away from the net wrapper assembly from pivot connection 80 to a distance where the operator may remove the net roll clear of the assembly. The operator then removes the guide 126 and slides the bearing 124 off the end of the net support tube 150 at second end 150b. The empty net roll is then slid off from second end 150b.

An operator installs a new net roll in reverse order. An operator lifts a new net roll onto the net support tube and pushes the net roll along the tube until the tube is flush against the bearing 124 near the pivot connection 80. Any removed guide and bearing is reinserted onto the tube and pushed flush against the net roll. The net support tube 150 is lifted and placed into the u-shape groove 84 and the swing handle 85 is lowered onto the end of the net support tube 150.

In the removal and installation of net roll, as described above, an operator is required to exert unnecessary time and energy. The operator is already burdened by having to pick up a new net roll from storage, typically located at the back of the baler. Net rolls located in proximity to the tailgate are susceptible to damage as the tailgate is repeatedly opened and closed to eject bails. The operator then must walk the new net roll, weighing approximately 45 kilograms (100 pounds), to the net wrapper assembly. With the net support tube extended away from the assembly, and bearing and guides removed, the operator then must lift the heavy roll up to meet the tube. Due to the awkwardness of holding up a heavy roll, often measuring 122 to 130 centimeters (48 to 51 inches) in length, the operator is challenged to place the net support tube into the net roll opening 104 of the net roll. Once the net support tube is inserted, the operator must continuously hold up the net roll as it is pushed down the support tube and flush against the bearing at the pivot connection. The operator will pull net wrapping from the roll for insertion in the net feeding entry 56. The operator also is tasked to take time to remove a bearing and guide at every net removal and replace a bearing and guide at every new net roll installation.

Embodiments of the present invention eliminate the time wasted removing and restoring the location of the bearing and guides along the net support tube by implementing a separable support tube for installing net rolls into a net wrapper assembly. Embodiments of the invention also limit the exerted manual labor required of an operator to retrieve and install a new net roll into the net wrapper assembly by implementing the separable support tube. Embodiments of the invention also provide a support platform located at the front of the baler to aid an operator with installation of a new net roll. In other embodiments of the invention, the platform stores spare net rolls to limit net roll exposure from damage near the tailgate. In other embodiments of the invention, the platform stores spare net rolls to eliminate the transfer of a net roll from the rear of a baler to the front of the baler.

Figure 5:
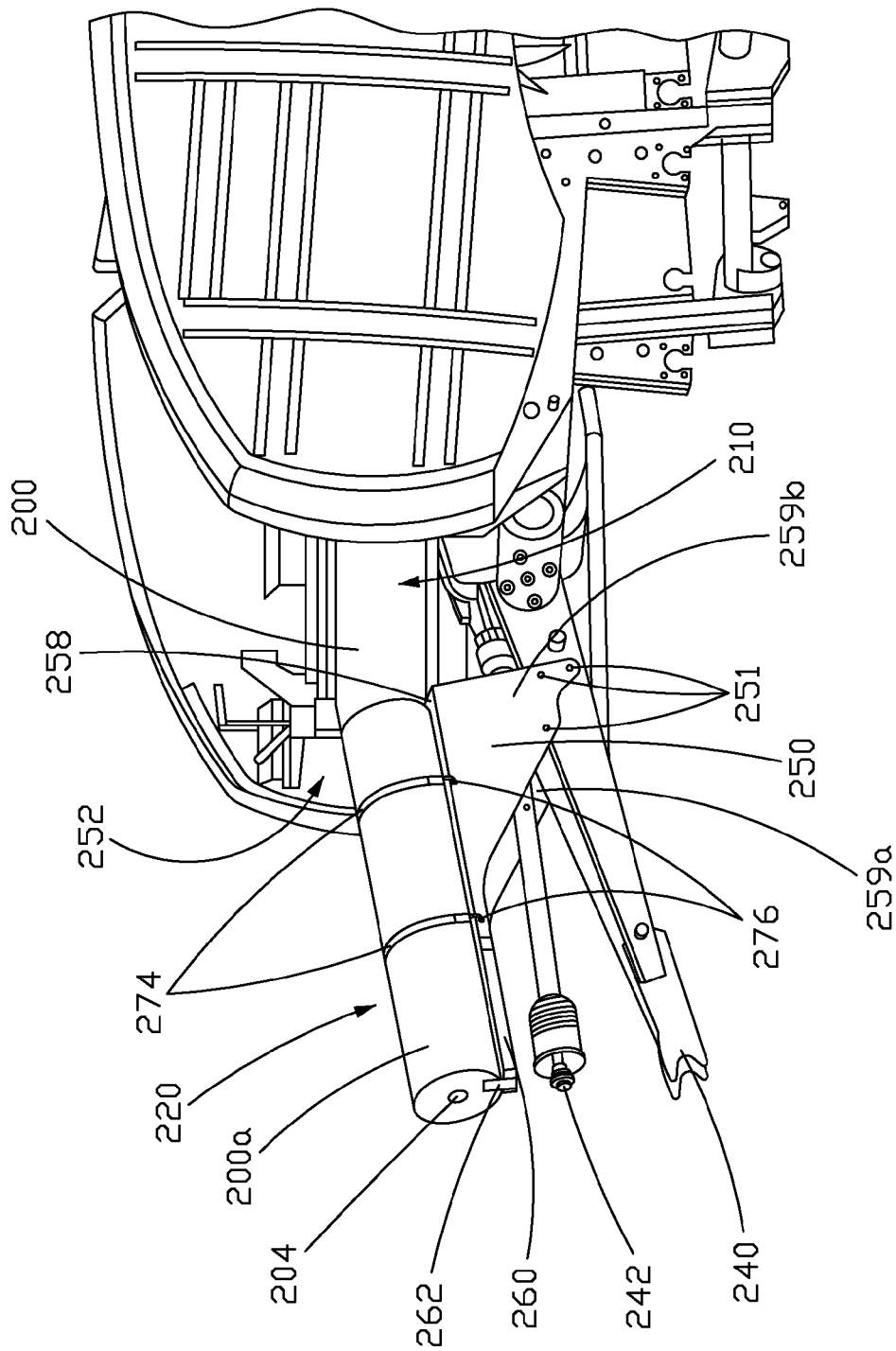
FIG. 5 illustrates an exemplary embodiment of the invention showing the net wrapper assembly, support platform, and two net rolls.

FIG. 5 illustrates an exemplary embodiment of the invention showing a net support platform 250, storing a net roll in front of the baler and in proximity to the net wrapper assembly. As shown, the net wrapper assembly 252 houses a net roll 200 in an active position 210 for wrapping a bale. This particular embodiment provides for net storage at the front of the baler, between the baler and the tractor. Another net roll or spare net roll 200a, rests on top a support platform 250 in stored position 220. As shown, the support platform is connected to sides of the hitch 240 by, for example, bolts 251. The support platform 250 may be constructed of steel, brass, composite, plastic, or any other material to support the weight of a net roll. In this embodiment, the support platform 250 is fixed sturdy by the bolts so as not to roll or bank forward and aft as the tractor tugs the baler. In other embodiments, the support platform may be clipped or strapped to the hitch 240 so that an operator can remove the platform at any time. In one embodiment, the width of the top surface 258 of the platform 250 is comparably as wide as the diameter of the net roll 200a. In other embodiments, the top surface 258 width of the platform 250 can be wide enough to hold two or more net rolls. As shown, the top surface 258 is connected to a pair of side skirts forming the platform 250. In the foreground, side skirt 259b is shown bolted to one side of the hitch 240. In the background as shown, side skirt 259a is shown bolted to the other side of the hitch 240. In some embodiments, the width of the platform 250 bridges over the PTO shaft 242 by aft side skirt 259a and forward side skirt 259b, both in connection with the top surface 258 of the support platform 250. In other embodiments, a single center support piece, in alternative to side skirts, holds up and is connected with the top surface 258 of the platform and also connected to the hitch 240. In other embodiments, one or more top surface support pieces are mounted to the hitch 240 and connected to the top surface to form the support platform 250. In this particular embodiment, the platform 250 stores the spare net roll 200a at a height from the ground approximate to the height of the net roll 200 in the active position 210. At this height, accessibility to and handling of the stored net roll for installation in the net wrapper assembly is greatly reduced at the benefit of the operator.

In this particular embodiment, the net roll 200a is stored on platform 250 in a position approximately perpendicular to a net support tube (see e.g., FIGS. 5-6) supporting the active net roll 200 in the net wrapper assembly 252. In other embodiments, the spare net roll 200a might lie on the support platform at any angle, as for instance horizontal so to be parallel with a net roll 200 in the active wrapping position 210 in the net wrapper assembly 252.

The spare net roll 200a at stored position 220 may be secured to the support platform 250 by straps 274. As shown, the straps may extend over the circumference of the stored net roll from vertical legs 270 (See FIG. 6) and connected at strap connection openings 276. In other embodiments, the connection opening 276 may be located anywhere in proximity to the support platform 250, as for example on other top surface support pieces. In other embodiments, the straps may number one or multiple. The straps may be leather, nylon, plastic, rubber, or any other material suitable to hold the stored net roll in place during operation of the baler.

As shown, an adjustable extension support 260 maybe integrated with the support platform 250, and is extended to support the remainder of net roll 200a at stored position 220 not resting on the top surface 258 of support platform 250. The adjustable extension support 260 can extend to a length necessary to support various lengths of net rolls. In addition, an end support 262 maybe located at the end of the adjustable extension support 260, opposite the extension support 260 connection with the platform 250. As shown in FIG. 5, the end support 262 fits flush against the end of a net roll 200a at stored position 220 facing away from the net wrapper assembly 252. As shown, the end support 262 is sufficient in height to deter sliding of the net roll 200a forward on the support platform 250 in a direction away from the net wrapper assembly 252. In other embodiments, the end support is of height to successfully clip to the net roll opening 204 to further stabilize the net roll on the platform 250. An additional end support may be connected to the opposite end of the platform 250 to support the other end of the net roll 200 closest to the net wrapper assembly 252. In some embodiments, when no extension support is available on the platform, end supports may be installed on both ends of the platform to prevent the net roll from sliding forward towards the tractor or aft towards the baler. In other embodiments, the end support may be replaced with a strap connected to the end of the extension support and the other end of the platform to strap down the net roll across its length about the outside of the net roll or through the net roll shaft passageway.

Figure 6:
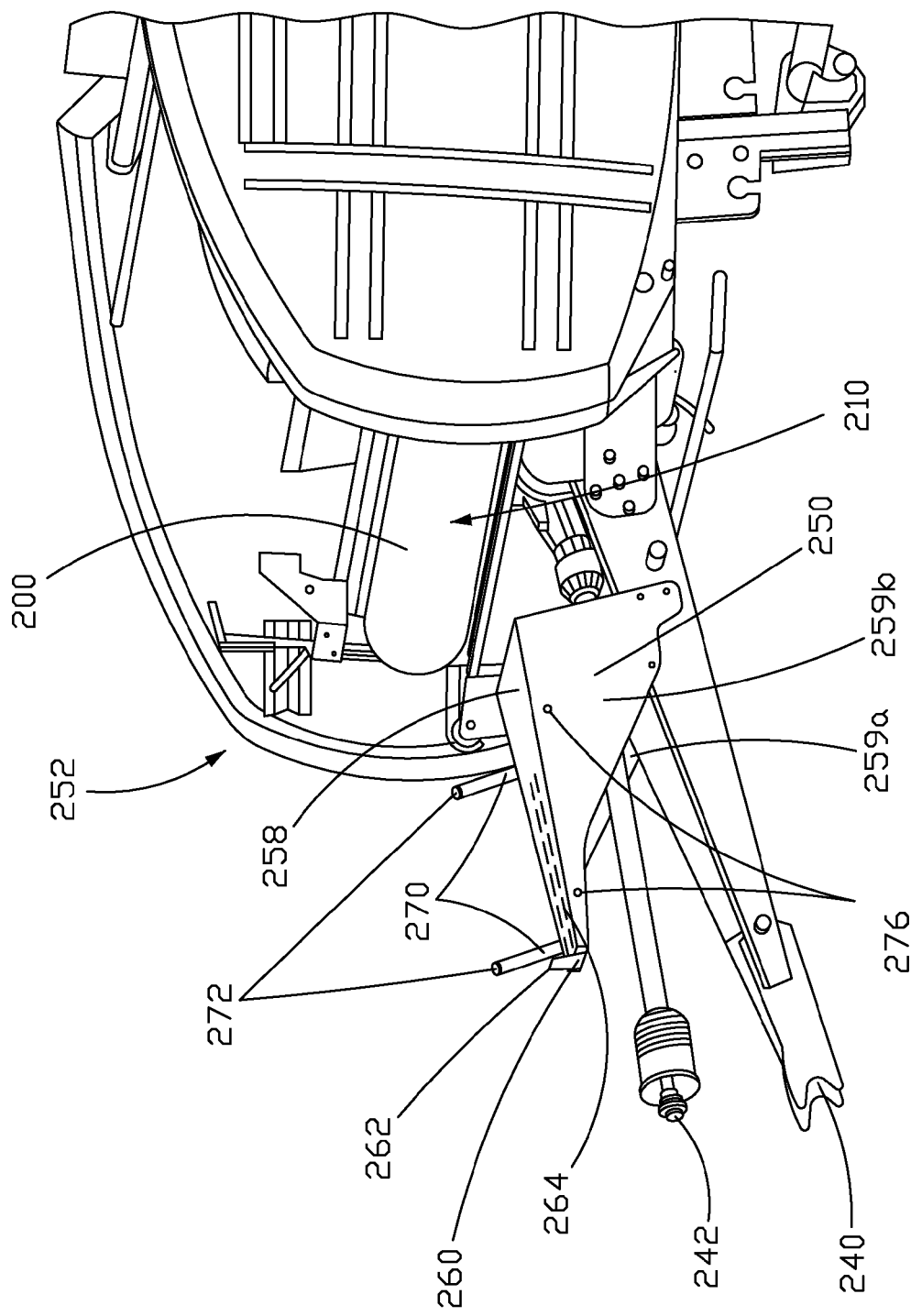
FIG. 6 illustrates an exemplary embodiment of the invention showing the net wrapper assembly, support platform, and one net roll.

FIG. 6 illustrates an exemplary embodiment of the invention showing the support platform 250 of FIG. 5 without a spare net roll stored on the top surface 258. With the stored net roll removed, FIG. 6 shows the adjustable extension support 260 in a retracted position. The adjustable extension support 260 slides in or out of an adjustable extension support channel 264 running flush along the top and centered about the surface length of the support platform 250. In some embodiments the adjustable extension support 260 can be slid out from channel 264 and removed all together. In some embodiments the adjustable extension support 260 can slide in channel 264 to any length and then be locked in position by lifting or dropping the extension support 260 into lock grooves along the channel 264. In some embodiments, the support channel 264 may also be used to hold the spare net roll in place on the support platform. For example, the surface of the support channel 264 may be lower than the top surface 258 of the support platform 250 so that a stored net roll partially lowers into the channel to prevent the roll from rolling along and off the top surface 258.

Also shown in FIG. 6, two vertical legs 270 are connected to the aft side skirt 259a of the support platform 250 opposite the forward side skirt 259b having strap connection openings 276. Vertical legs 270 stand approximately perpendicular to the top surface of the support platform 250 so as to support a cylindrical stored net roll from rolling off the surface in the direction opposite the strap connection openings 276. The vertical legs 270 also serve as a back support when an operator initially places a net roll on to the platform 250 to prevent the roll from rolling off and to allow the operator to strap down the roll. As shown, strap anchor points 272 are located approximately near the top of each vertical leg 270. In other embodiments of the invention, one or multiple vertical legs may be installed to any side of the platform or any other top surface support piece. In other embodiments, for additional support, one or more vertical legs may be connected, via clip or lock connection, on both sides of the platform to provide added support to the stored net roll. In other embodiments, a backstop or bridging device may be connected horizontally to two or more vertical legs on a side of the platform to provide further support to a net roll. The backstop may be adjusted to approximate the length of the net roll. In other embodiments, the vertical legs may rotate about a pivot connection with the platform 250. Thus, an operator could turn the legs horizontally or vertically down when the operator wants to roll off the stored net roll to either side of the platform 250.

In addition, straps 274, as shown in FIG. 5, attach at the strap anchor points 272 and extend around the circumference of a stored net roll for connection at the strap connection openings 276. In some embodiments of the invention, hooks at the end of each strap are inserted and secured at the openings 276. In other embodiments of the invention, the straps made of velcro can be inserted through the connection openings 276 and attached. In other embodiments, leather or nylon straps could simply be tied at the connection openings 276. In other embodiments, elastic rubber straps may be extended from the strap anchor points 272 and looped around hooks located on the support platform 250 in alternative to the strap connection openings 276.

FIGS. 7-11 illustrate exemplary embodiments of the invention for installing a stored net roll from the exemplary position on a support platform located at the front of the baler to an active position within the net wrapper assembly. The exemplary embodiments shown relieve an operator from having to support the weight of a net roll while transitioning the stored net roll into an active position.

Figure 7:
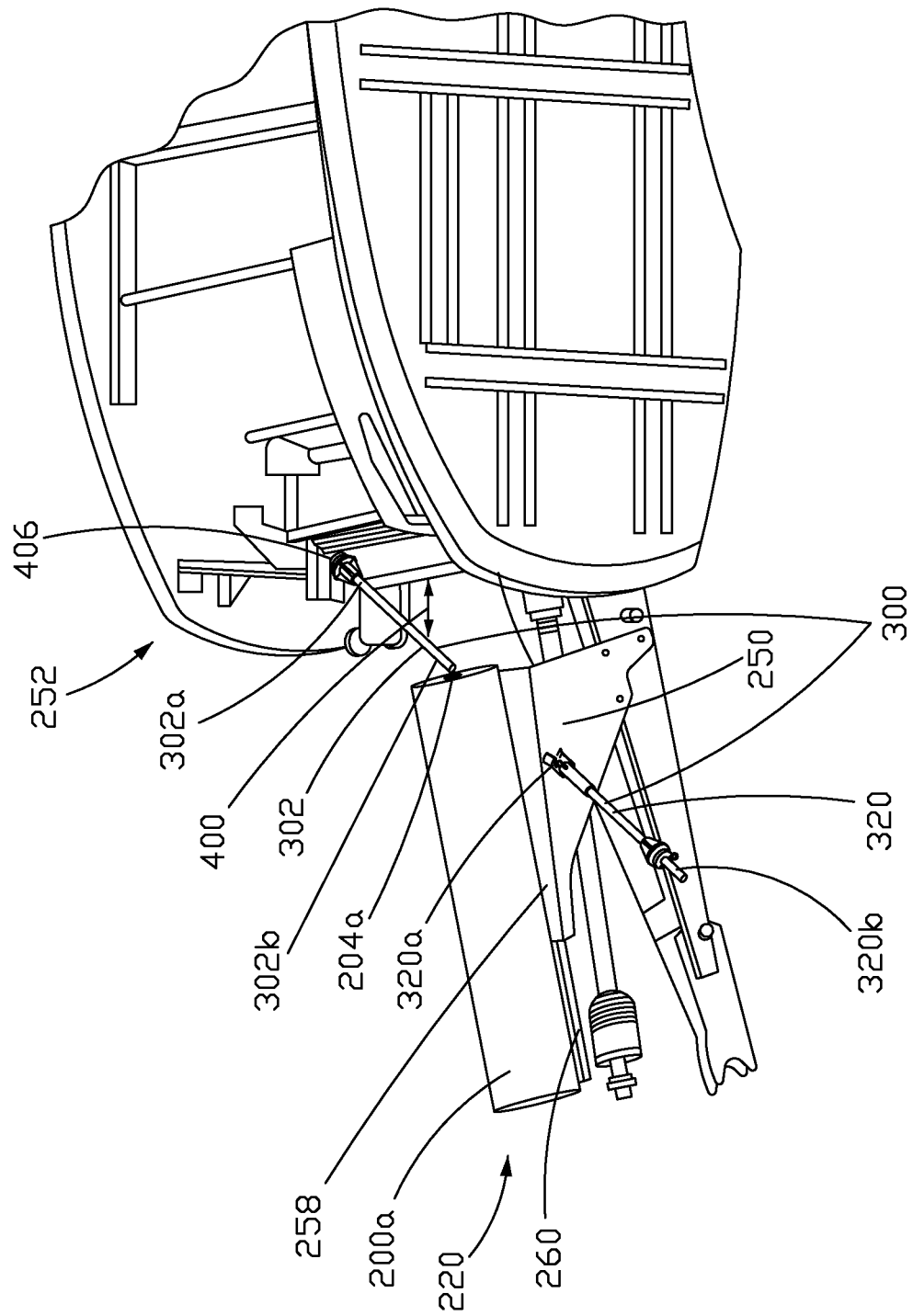
FIG. 7 illustrates an exemplary embodiment of the invention showing installation of one support tube piece in a net roll.

FIG. 7 illustrates an exemplary embodiment of the invention showing a separable net support tube 300 for installing a stored net roll into a net wrapper assembly 252. As shown, the spare net roll 200a at stored position 220 rests on the top surface 258 of the support platform 250 and the adjustable extension support 260. A separable net support tube 300 is shown separated in two pieces, a pivoting support tube piece 302 having a first end 302a and second end 302b, and an insert support tube piece 320 having a first end 320a and second end 320b. In other embodiments of the invention, the separable net support tube 300 may be separated into three or more pieces. In some embodiments of the invention, the separated pieces maybe of equal length. In other embodiments of the invention, the separated pieces maybe of unequal length.

Prior to installing a new net roll from the support platform, the operator in this embodiment would unhook and remove any strapping holding down the net roll. In other embodiments the operator might also remove or reposition the vertical legs 270 (See FIG. 6). The operator would then pivot the pivoting support tube piece 302 at a first end 302a about the pivot connection 406 to an index position 400 wherein the second end 302b of the pivoting support tube piece 302, would be in a position of proximity to a net roll opening 204a of net roll 200a, facing the net wrapper assembly 252.

Figure 8:
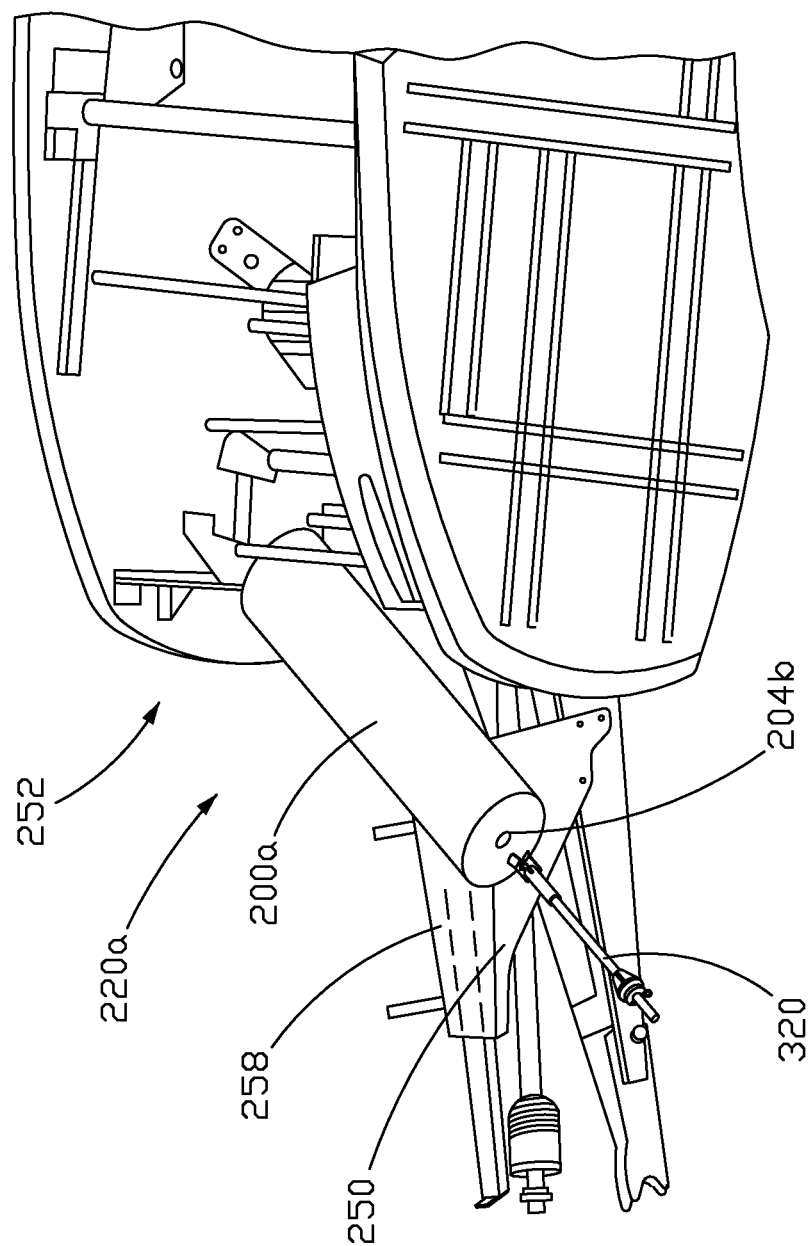
FIG. 8 illustrates an exemplary embodiment of the invention showing installation of another support tube piece in a net roll.

FIG. 8 illustrates an exemplary embodiment of the invention showing the previously stored net support tube partially installed in the net wrapper assembly about one piece 302 of the separable net support tube 300. In addition to steps described above in relation to FIG. 7, in this exemplary embodiment, the operator can pivot the net roll 200a from stored position 220, as shown in FIG. 6, to a partially installed position 220a within the net wrapper assembly shown in FIG. 8. More specifically, the operator rotates the net roll 200a on the top surface 258 of the support platform 250 so that the pivoting support tube piece 302 is inserted into the net roll opening 204a (not shown), opposite the side of net roll opening 204b shown in FIG. 8.

Figure 9:
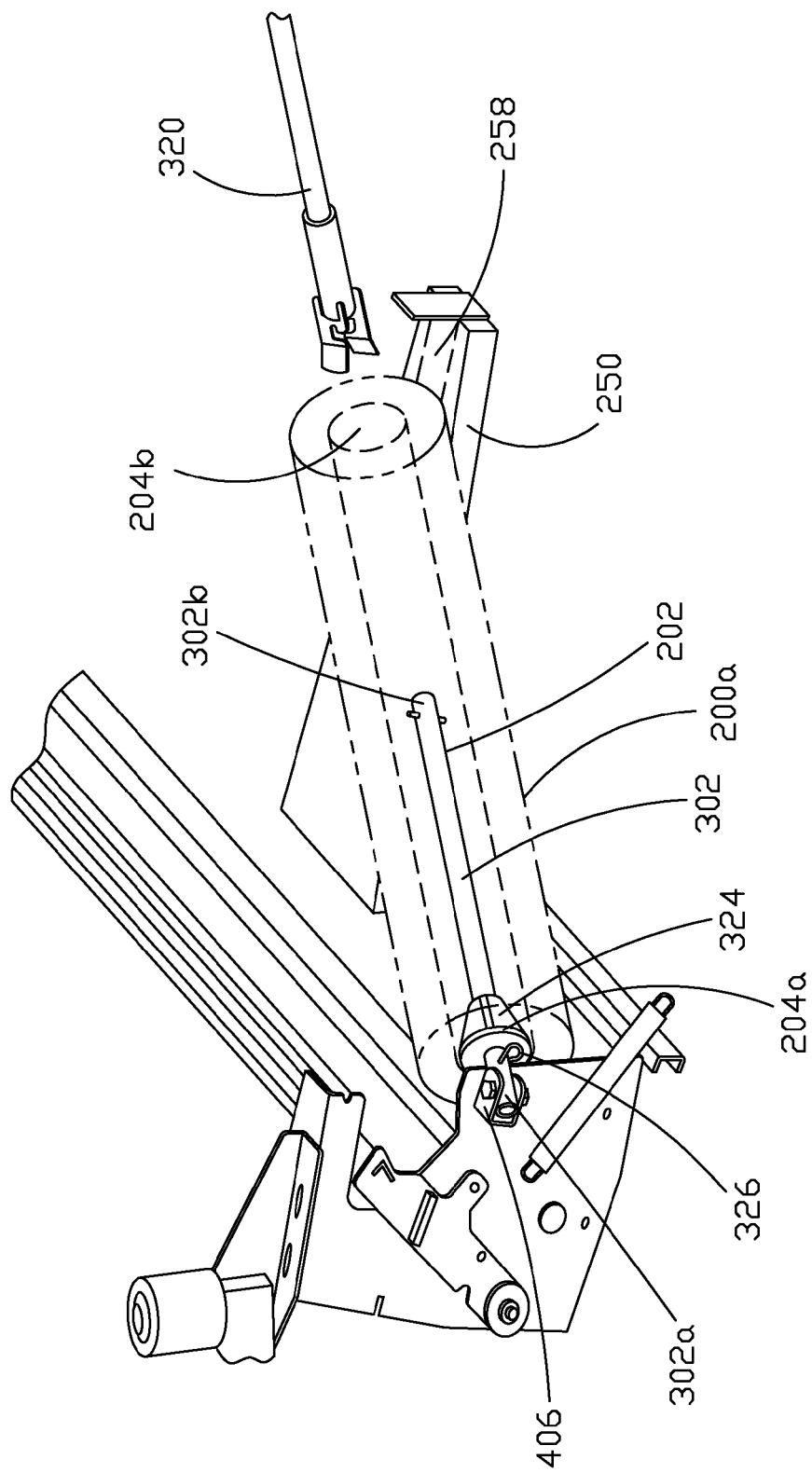
FIG. 9 illustrates an exemplary embodiment of the invention showing net support tube pivot connection with the net wrapper assembly.

FIG. 9 illustrates the exemplary embodiment shown in FIG. 8 from an opposite angle showing a cross sectional view of the net roll 200a and the pivoting support tube piece 302 about pivot connection 406. The operator pushes the net roll 200a so that the second end 302b of the pivoting support tube piece 302 enters the net roll opening 204a and the pivoting support tube piece 302 then slides through the net roll shaft passageway 202 until the end of the net roll 200a presses flush against the base end of a cone bearing 324 near the first end 302a of the pivoting support tube piece 302. The cone bearing 324 is shown located at the first end 302a of the pivoting support tube piece 302, against a guide 326, nearest the pivot connection 406. The cone shape bearing is similar to the prior art concepts discussed earlier. The net roll 200a is installed on the pivoting support piece 302 while the net roll rests on top surface 258 of the support platform 250, as shown in FIG. 8. Therefore, the operator is no longer burdened to lift and support the weight of the net roll while trying to install into the net wrapper assembly. The operator can simply move the net roll in rotation about the top surface 258 of the support platform 250 until the pivoting support tube piece 302 is properly inserted. As shown in FIG. 9, the insert support tube piece 320 has not yet entered net roll opening 204b opposite the pivot connection 406.

Figure 10:
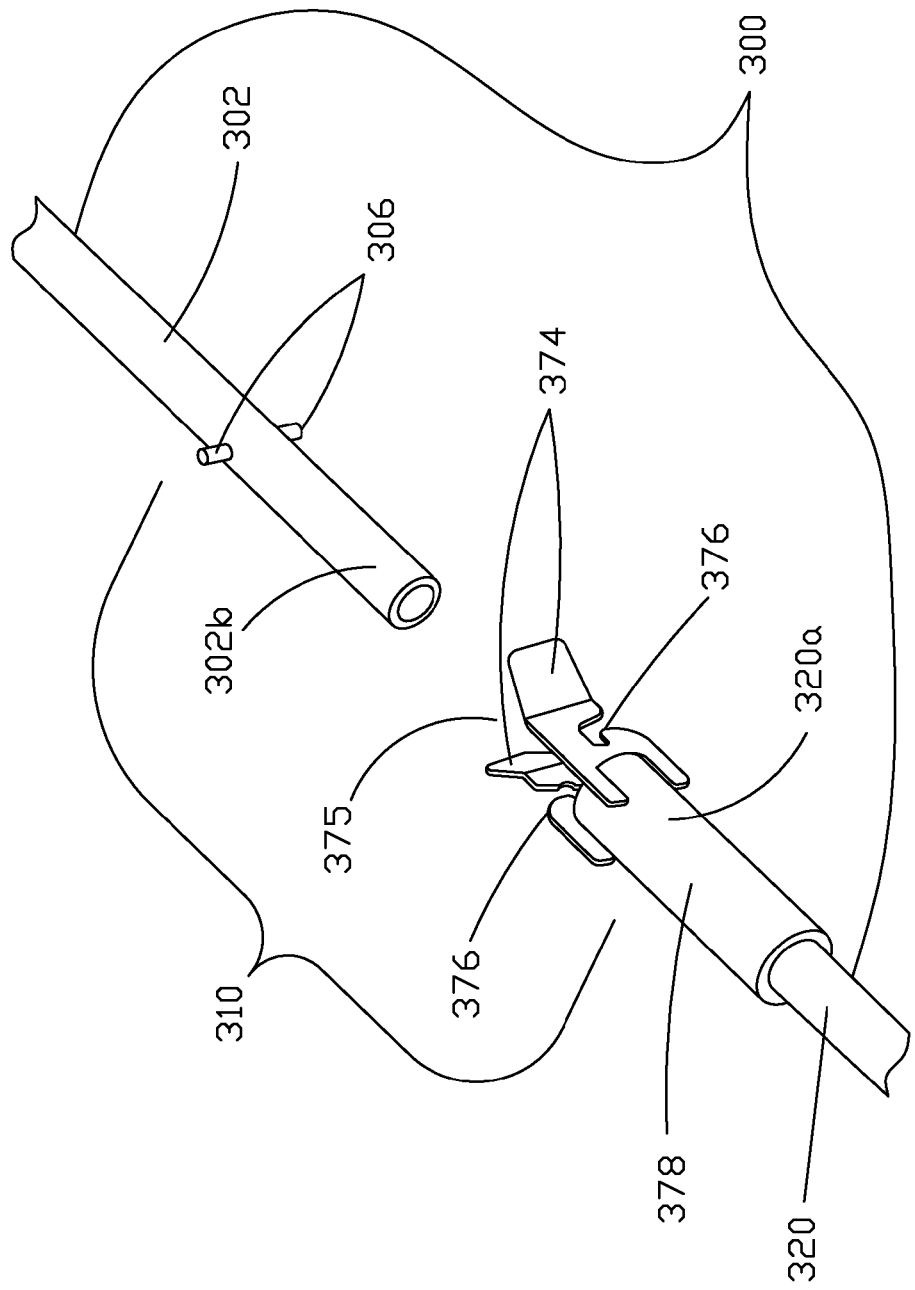
FIG. 10 illustrates an exemplary embodiment of the invention showing locking mechanisms of a separable support tube.

FIG. 10 illustrates exemplary embodiments of the invention showing the separated net support tube 300 connection ends. In this particular embodiment, the separable net support tube 300 is shown in FIG. 10 as separated about a support tube lock connection 310. A sleeve 378 is mounted to the first end 320a of the insert support tube piece 320 so that the tube fits into the sleeve and so that the other end of the sleeve provides for a larger diameter opening than the tube so as to eventually receive the diameter of the pivoting support tube piece 302 within. Alignment tabs 374 are mounted to the sleeve 378 of the insert support tube piece 320. Two lock pin grooves 376 are cut away between the tabs and tubing. When the insert support tube piece 320 connects with the pivoting support tube piece 302, the second end 302b of the pivoting support tube piece 302 is slid into the sleeve 378 located on the first end 320a of the insert piece 320. Alignment tabs move down the tube of the pivoting piece 302 as it is inserted. The alignment tabs aid an operator, connecting the two pieces, to orient the insert support tube piece 320 about the pivot support tube piece 302 such that lock pins 306, extending through the diameter of the pivoting support tube piece 302, are guided through an alignment tab channel 375 to the opening of the sleeve 378 on the insert support tube piece 320.

In other embodiments, one or multiple alignment tabs may be mounted at end 320a of the insert tube piece 320. In other embodiments, one or multiple lock pins and lock pin grooves may be utilized. In other embodiments, location of the alignment tabs, lock pins, and lock pins grooves may be relocated on the other separable support tube piece. Other types of guides, known in the industry and as appreciated by those in the art, may be utilized to aid an operator align the separable tube pieces. Various locking systems and key systems may also be utilized in other embodiments to secure connection between the two pieces.

Figure 11:
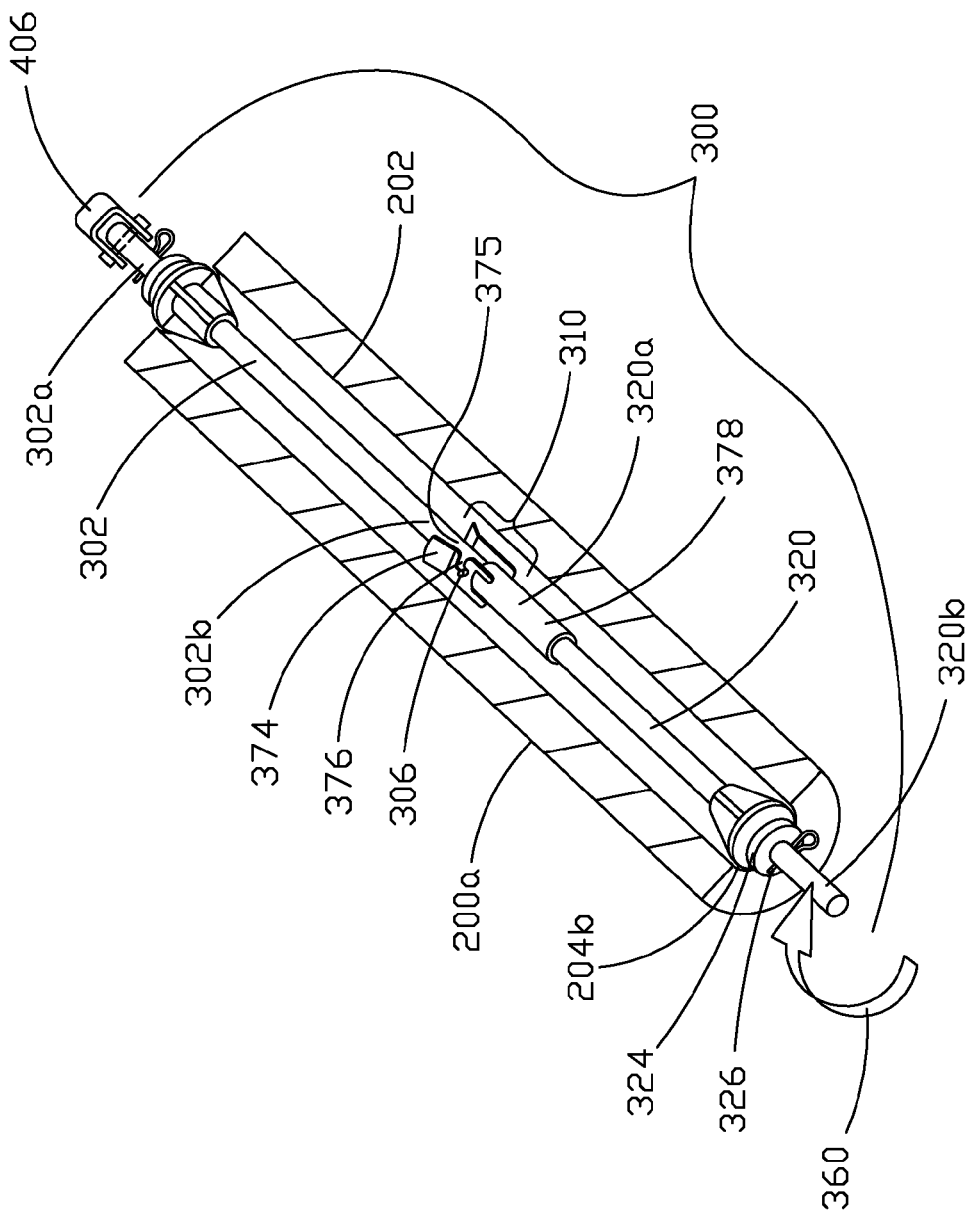
FIG. 11 illustrates an exemplary embodiment of the invention showing locking mechanisms of a separable support tube in a net roll.

FIG. 11 illustrates a detailed cross-sectional view of an embodiment of the present invention showing connection of the separable net support tube 300 inside the supported net roll 200a. In this embodiment, the operator installs the insert support tube piece 320 into the net roll opening 204b. The alignment tabs 374 on the insert support tube piece 320 aid the operator in finding the pivot support tube piece 302 housed inside the net roll shaft passageway 202 and connected at pivot connection 406. The alignment tabs 374 guide the operator to turn the insert tube piece 320 such that the extensions of the lock pin 306 slide through the alignment tab channel 375 as the pivoting support tube 302 slides into the sleeve 378 on the first end 320a of the insert support tube 320. In this particular embodiment, with the net roll firmly resting on the support platform 250 and supported by the pivoting support tube piece 302, previously installed in the roll, an operator is capable of using one or two hands to slide in the insert support tube piece 320 without having to awkwardly lift and hold the net roll during installation.

In other embodiments of the invention, the insert tube piece 320 may be adjustable telescopically such that the piece might be extended or retracted by the operator. A telescopic tube piece may be retracted so as to be placed out of the way, for instance on the support platform 250, without concerning the operator that the piece may roll off during installation of the net roll on the pivot support tube piece 302. The insert tube piece 320 may then be extended into the net roll for connection with the pivot support tube piece 302. Once connection is made, the operator can further push the insert tube piece 320, as it retracts, so that the bearings 324 are flush against the net roll opening 204b (shown in FIG. 9). In another embodiment, the pivot support tube piece 302 may be telescopic. Prior to installation, the pivot support tube piece 302 may be fully retracted. As the pivot support tube piece is introduced into the net roll opening 204a, the operator can use a rod with a hooked end to hook a hole or clip at the end of the pivot support tube piece 302 and pull to extend the telescopic tube through the remainder of the net roll shaft passageway 202. In some embodiments, a smaller insert tube piece, with bearing 324 and guide 326 installed, could be connected to the telescopic pivot support tube piece extended through the entire length of the net roll shaft passageway 202 and outside the net roll opening 204b on the opposite side of the pivot connection 406 so that the operator has visibility to make the connection of the support tube pieces.

Shown in FIG. 11, in this embodiment, to finalize connection of the separable net support tube 300 within the net roll 200a, the operator will turn the insert support tube piece 320 in lock turn direction 360 until the lock pin 306 on the pivoting support tube piece 302 slides inside the lock pin grooves 376. Based on the design of the lock connection 310 in this embodiment, an operator will approximately turn the insert support tube piece 320 forty-five degrees or quarter turn to lock. The insert support tube piece 320 and pivoting support tube piece 302 are securely connected at the support tube lock connection 310 forming the separable support tube 300. To disconnect and remove the insert support tube piece 320 in this embodiment, an operator must rotate the insert tube piece opposite the lock turn direction 360 a quarter turn. After turning, the lock pin 306 will again reside within the alignment tab channel 375 where the operator may pull out and remove the insert support tube 320.

Figure 12:
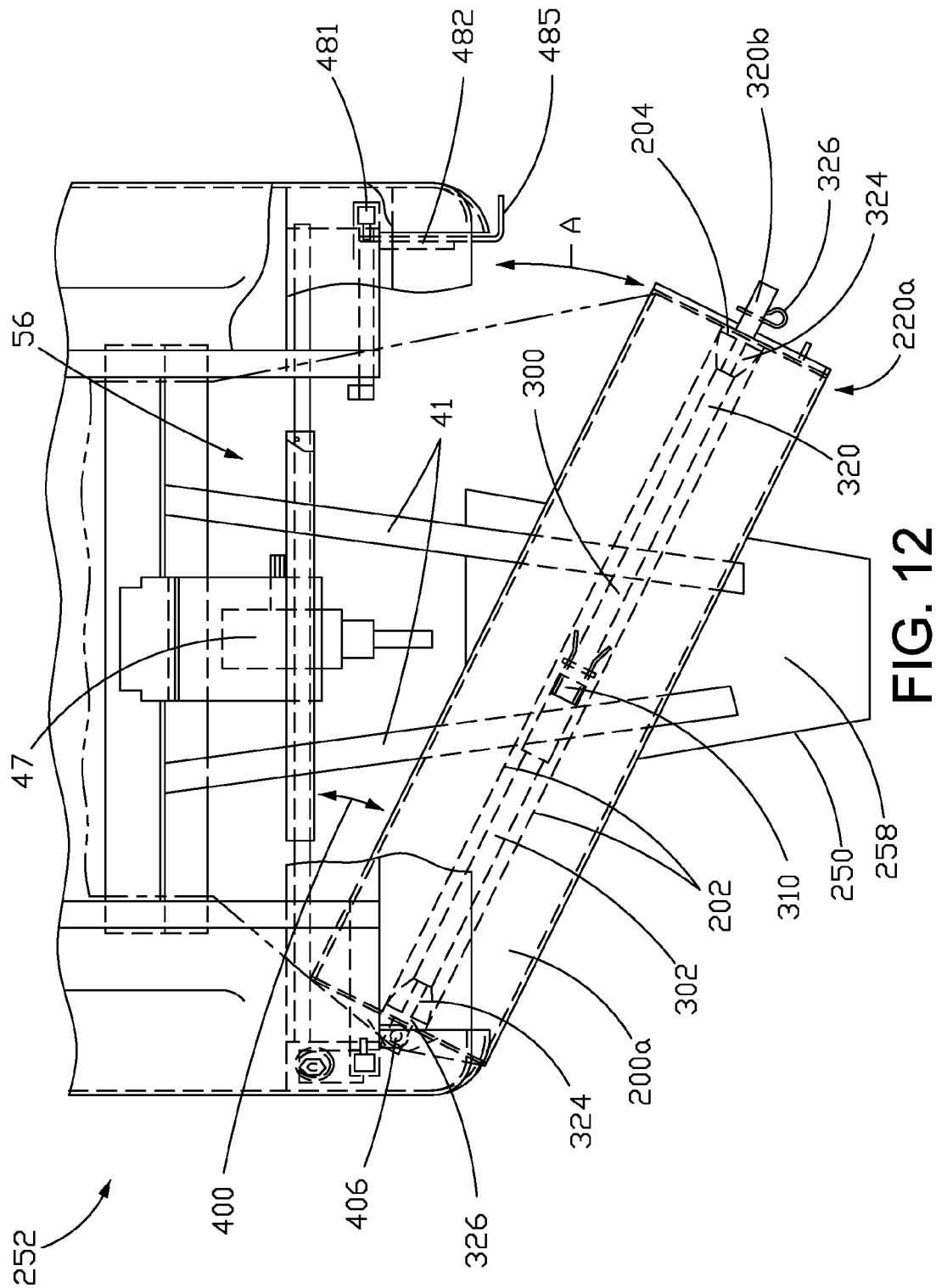
FIG. 12 illustrates a top view of an exemplary embodiment of the net wrapper assembly.

FIG. 12 illustrates a top view from above the net wrapper assembly 252 and embodiments of the present invention showing the separable net support tube 300 inside the net roll 200a. After the insert support tube 320 is connected and locked to the pivoting support tube 302 at the support tube connection 310 the operator may choose to feed wrapping into the feeding entry. The operator may choose to feed wrapping anytime while the net roll is fully supported by the platform 250. Once some wrapping is fed, the operator can swing along direction A the net roll 200a housed on the separable support tube 300 towards the net wrapper assembly 252 pivoting from pivot connection 406 and out of index position 400 and the practically installed position 220a. As the net roll is swung into the assembly, the net roll 220a weight is fully supported by the separable support tube 300 installed within, such that the platform 250 no longer supports the mass of the net roll as the roll is moved off of the platform 250. The non-pivoting connection end, the second end 320b of the insert support tube 320, is swung and connected at the arm lock connection 481. The second end 320b is placed by the operator in the u-shape groove (not shown) and swing handle 485 is released lowering the arm 482 onto the net roll to secure the roll. The net roll is then in an active position within the net wrapper assembly 252 for wrapping bale.

When removing a net roll from the active position, an operator lifts the arm 482 utilizing the swing handle 485, removes the second end 320b of the separable support tube 300 from the u-shape groove, and rotates the net roll and support tube out from the net assembly to either the index position 400 or at some other angle from the net wrapper assembly to clear the empty roll from the tube. The operator unlocks the insert support tube 320 from the pivoting support tube piece 302 and pulls the insert support tube piece 320 out from the empty net roll. The operator then removes the empty net roll from the pivot support tube piece 302. The empty net roll is far lighter in weight with the wrapping used for baling the crop material. Thus, the operator may choose either to utilize or not utilize the support platform 250 when removing the empty roll. If the operator plans to install a new net roll, the steps described above for the following embodiment are executed.

In this embodiment, the operator does not have to remove nor reconnect the guide 326 or bearing 324 to install the separable support tube 300 at the arm lock connection 481. During all steps of installation, as described in this embodiment, the operator does not have to lift or support the weight of the net roll when installing the net roll into the net wrapper assembly from a storage position to the active position.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A baler comprising:
a net wrapper assembly;
a separable net support tube comprising a first support tube, a second support tube, and a mating connection;
a first end of the first support tube is connected to the net wrapper assembly at a pivoting element on the net wrapper assembly;
a second end of the first support tube and a first end of the second support tube are connected at the mating connection within a net roll forming the separable net support tube during installation of the net roll into the net wrapper assembly; and the formed separable net support tube is attached to the net wrapper assembly at a second end of the second support tube when the net roll is in a wrapping active position within the net wrapper assembly; and
a platform that supports the weight of the net roll during installation, wherein the platform comprises a top surface where the net roll lies during installation and one or more top surface support pieces connected to the top surface and extending below the top surface and mounted to the baler in proximity to the front of the baler.

2. The baler of claim 1 wherein the platform is configured such that the net roll is supported in a loading position on the top surface prior to installation.

3. The baler of claim 2 wherein the platform further comprises an adjustable extension support to support net rolls of various lengths, wherein the adjustable extension support lies in a support channel on the top surface of the platform located centrally in the top surface and extending to an edge of the top surface so that the adjustable extension support may be extended outside of the edge to increase support of the net roll stored on the top surface of the platform.

4. The baler of claim 3 wherein the adjustable extension support is slidably extendable beyond the edge of the platform by sliding the adjustable extension support out of the support channel to increase for longer length net rolls or retracted by sliding the adjustable extension support into the edge to support shorter length net rolls.

5. The baler of claim 3 wherein a top side surface of the support channel is below the top surface of the platform to support a portion of the net roll partially lying on the topside surface to prevent the net roll from rolling laterally off the top surface of the platform.

6. The baler of claim 3 wherein the adjustable extension support comprises an end support mounted to one end of the adjustable extension support to prevent the net roll from sliding forward or backward off the edge of the top surface of the platform.

7. The barer of claim 2 wherein the platform comprises one or more legs mounted to one or more of the top surface support pieces of the platform and extending above the top surface of the platform to prevent a stored net roll from rolling laterally off the top surface of the platform.

8. The baler of claim 7, wherein the one or more legs rotate about a pivot connection on one of the top surface support pieces wherein the one or more legs rotate vertically up to contain the stored net roll on the top surface of the platform.

9. The baler of claim 2, wherein the platform stores the net roll in a perpendicular position relevant to a net roll support bar holding a net roll in the active position in the net wrapper assembly.

10. The barer of claim 2, wherein the net roll stored on the platform is located at approximately the same height from the ground as a net roll held by a net roll support bar in the active position in the net wrapper assembly.

11. The baler of claim 1, wherein the one or more top surface support pieces of the platform are bolted to a hitch linking the baler with a tractor.

12. The baler of claim 1, wherein the second support tube is telescopic extending to connect to the first support tube at the mating connection.

13. The baler of claim 1, wherein the second end of the first support tube is operative to receive a first opening of a shaft passageway extending from the first opening through the net roll to a second opening in the net roll; and
the first end of the second support tube is operative to receive the second opening of the shaft passageway.

14. A baler comprising:
a net wrapper assembly;
a separable net support tube comprising a first support tube a second support tube, and a mating connection;
a first end of the first support tube is connected to the net wrapper assembly at a pivoting element on the net wrapper assembly;
a second end of the first support tube and a first end of the second support tube are connected at the mating connection within a net roll forming the separable net support tube during installation of the net roll into the net wrapper assembly; and the formed separable net support tube is attached to the net wrapper assembly at a second end of the second support tube when the net roll is in a wrapping active position within the net wrapper assembly; and
wherein the mating connection is secured by a lock, wherein the lock is formed when the second end of the first support tube comprising a lock pin enters a sleeve on the first end of the second support tube comprising a pin guide and the second support tube is turned such that the lock pin slides into the pin guide.

* * * * *